US009692521B1

(12) United States Patent
Zhou et al.

(10) Patent No.: US 9,692,521 B1
(45) Date of Patent: Jun. 27, 2017

(54) POLARIZATION PRE-COMPENSATION TECHNIQUE FOR POLARIZATION-DIVISION-MULTIPLEXED DIRECT-DETECTION OPTICAL COMMUNICATION SYSTEMS

(71) Applicant: Google Inc., Mountain View, CA (US)

(72) Inventors: Xiang Zhou, Los Altos, CA (US);
Ryohei Urata, San Carlos, CA (US);
Christopher Lyle Johnson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 154 days.

(21) Appl. No.: 14/793,433

(22) Filed: Jul. 7, 2015

(51) Int. Cl.
| | |
|---|---|
| *H04J 14/06* | (2006.01) |
| *H04B 10/58* | (2013.01) |
| *H04B 10/2507* | (2013.01) |
| *H04B 10/556* | (2013.01) |

(52) U.S. Cl.
CPC ......... *H04B 10/58* (2013.01); *H04B 10/2507* (2013.01); *H04B 10/556* (2013.01); *H04J 14/06* (2013.01)

(58) Field of Classification Search
CPC .. H04B 10/58; H04B 10/556; H04B 10/2507; H04J 14/06
USPC .......................................................... 398/65
See application file for complete search history.

(56) References Cited

U.S. PATENT DOCUMENTS

| | | | | |
|---|---|---|---|---|
| 5,949,821 A | * | 9/1999 | Emami | H03D 3/008 333/28 T |
| 2003/0156776 A1 | * | 8/2003 | Han | G02B 6/2713 385/11 |
| 2003/0175033 A1 | * | 9/2003 | Taga | H04J 14/06 398/152 |
| 2004/0203472 A1 | * | 10/2004 | Chien | H04B 1/30 455/68 |

(Continued)

OTHER PUBLICATIONS

Boroditsky, Brodsky, Frigo, Magill, Rosenfeldt, "Polarization Dynamics in Installed Fiberoptic Systems," in Proc LEOS, 2005, paper TuCC1, p. 414415.
Ghiasi, A., et al., "Investigation of 100GbE Based on PAM4 and PAM8," IEEE 802.3bm Fiber Optic Task Force, Geneva, Switzerland, Sep. 2012.

(Continued)

*Primary Examiner* — Juan A Torres
(74) *Attorney, Agent, or Firm* — McDermott Will & Emery LLP

(57) ABSTRACT

This disclosure provides systems, methods, and apparatus for mitigating the effects of an optical link in a communication system on polarization angles of signals transmitted over the optical link. The communication system can include an optical transmitter transmitting polarization-division multiplexed (PDM) optical signals over the optical link and a direct-detection receiver for receiving the PDM optical signals. The transmitter can include a polarization compensation unit for receiving estimated values of link polarization parameters from the receiver. The receiver uses the estimated values to pre-distort modulator drive and bias signals and to adjust the relative phase between modulated optical signals. The transmitter can also transmit training optical signals to the receiver over the optical link. The receiver uses (Continued)

the training optical signals to estimate the values of link polarization parameters. The receiver also can include a crosstalk mitigation unit for mitigating effects of crosstalk between the PDM optical signals.

18 Claims, 4 Drawing Sheets

(56) References Cited

U.S. PATENT DOCUMENTS

| | | | | |
|---|---|---|---|---|
| 2008/0212662 | A1* | 9/2008 | Lee | H03D 3/009 375/224 |
| 2012/0020659 | A1* | 1/2012 | Ibragimov | H04B 10/0775 398/16 |
| 2012/0148265 | A1* | 6/2012 | Chang | H04B 10/6161 398/208 |

OTHER PUBLICATIONS

J. N. Damask, Polarization Optics in Telecommunications, 1st ed. New York: Springer, 2004.

Kai, Yutaka, et al, "Experimental Comparison of Pulse Amplitude Modulation (PAM) and Discrete Multi-tone (DMT) for Short-Reach 400Gbps Data Communication," ECOC 2013, paper Th.1.F.3.

Krummrich, Schmidt, Weishausen, Mattheus, "Field Trial on statistics of fast polarization changes in long haul WDM transmission systems," in Proc. OFC 2005, paper OThT6.

Morsy-Osman, M. et al, "13BB × 224 Gb/s 10 km Transmission of Polarization Division Multiplexed PAM4 Signals Using 1.3 3BCm SiP Intensity Modulator and a Direct-Detection MIMO-based Receiver," ECOC 2014, PD. 4.4.

Peterson, Leo, Rochford, "Field Measurements of state of Polarization and PMD from a tier-1 Carrier", in Proc. OFC 2004, paper FI1.

Wei, J.L., et al, "Comparison of 100 Gb/s Ethernet Links using PAM8, Multi-pulse, and Hybrid CAP16/QAM16 Modulation Schemes," ECOC 2013, paper Th.1.F.2.

* cited by examiner

POLARIZATION PRE-COMPENSATION TECHNIQUE FOR POLARIZATION-DIVISION-MULTIPLEXED DIRECT-DETECTION OPTICAL COMMUNICATION SYSTEMS

TECHNICAL FIELD

This disclosure relates to the field of communication networks, and in particular to communication transceivers.

DESCRIPTION OF THE RELATED TECHNOLOGY

Communication systems, such as optical communication systems, include transmitters and receivers for communicating data over communication links. Some high bandwidth data transmission communication systems employ polarization-division multiplexing techniques over optical communication links for transmitting data from a transmitter to a receiver. The communication link may introduce undesirable polarization angle rotation and crosstalk in the multiplexed optical signals transmitted between the transmitter and the receiver, thereby reducing signal quality.

SUMMARY

According to one aspect, the subject matter described in this disclosure relates to an optical transmitter including a drive signal generator, a polarization compensator, a first electro-optic modulator, a second electro-optic modulator, a phase shifter and a polarization-division multiplexer. The drive signal generator is configured to generate a first data signal corresponding to a first data stream and a second data signal corresponding to a second data stream distinct from the first data stream. The polarization compensator configured to receive from a receiver estimates of values of link parameters associated with an optical link connecting the receiver and the optical transmitter, where the link parameters include a link polarization rotation parameter and a phase shift parameter. The polarization compensator is further configured to pre-distort the first data signal and the second data signal based on the link polarization rotation parameter to generate a first set of pre-distorted drive signals and a second set of pre-distorted drive signal and to generate a phase shift signal based on the phase shift parameter. The first electro-optic modulator is configured to modulate an optical carrier based on the first set of pre-distorted drive signals to generate a first modulated optical signal. The second electro-optic modulator is configured to modulate the optical carrier based on the second set of pre-distorted drive signals to generate a second modulated optical signal. The a phase shifter is configured to cause a shift in the phase of the first modulated optical signal relative to the phase of the second modulated optical signal based on the phase shift signal. The polarization-division multiplexer is configured to polarization multiplex the first modulated optical signal with a first polarization and the second modulated optical signal with a second polarization for transmission over the optical link.

According to another innovative aspect, the subject matter described in this disclosure relates to an optical transceiver including a direct detection optical receiver. The direct detection optical receiver is configured to receive an optical signal, where the receiver includes a polarization division demultiplexer configured to split the received optical signal into a first polarized optical signal and a second polarized optical signal, a first photo-detector configured to generate a first electrical signal based on the intensity of the first polarized optical signal, a second photo-detector configured to generate a second electrical signal based on the intensity of the second polarized optical signal, and a polarization parameter extraction unit configured to estimate values of link parameters representing at least an estimated angle of rotation of polarization introduced by the optical link on an optical signal transmitted by a transmitter to the direct detection optical receiver across an optical link and to transmit the estimated values of the link parameters the transmitter.

According to another innovative aspect, the subject matter described in this disclosure relates to a method for communicating optical signals over an optical communication link. The method includes generating a first data signal corresponding to a first data stream and a second data signal corresponding to a second data stream distinct from the first data stream, receiving from a receiver estimates of values of link parameters associated with an optical link connecting the receiver and a transmitter, the link parameters including a link polarization rotation parameter and a phase shift parameter, generating a first set of pre-distorted drive signals and a second set of pre-distorted drive signal by pre-distorting the first data signal and the second data signal based on the estimated values of the link polarization rotation parameter, generating a phase shift signal based on the estimated values of the phase shift parameter, modulating an optical carrier signal based on the first set of pre-distorted drive signals to generate a first modulated optical signal having a first polarization, modulating the optical carrier signal based on the second set of pre-distorted drive signals to generate a second modulated optical signal having a second polarization, causing a shift in the phase of the first modulated optical signal relative to the phase of the second modulated optical signal based on the phase shift signal, and polarization-division multiplexing the first modulated optical signal and the second modulated optical signal for transmission over the optical link.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
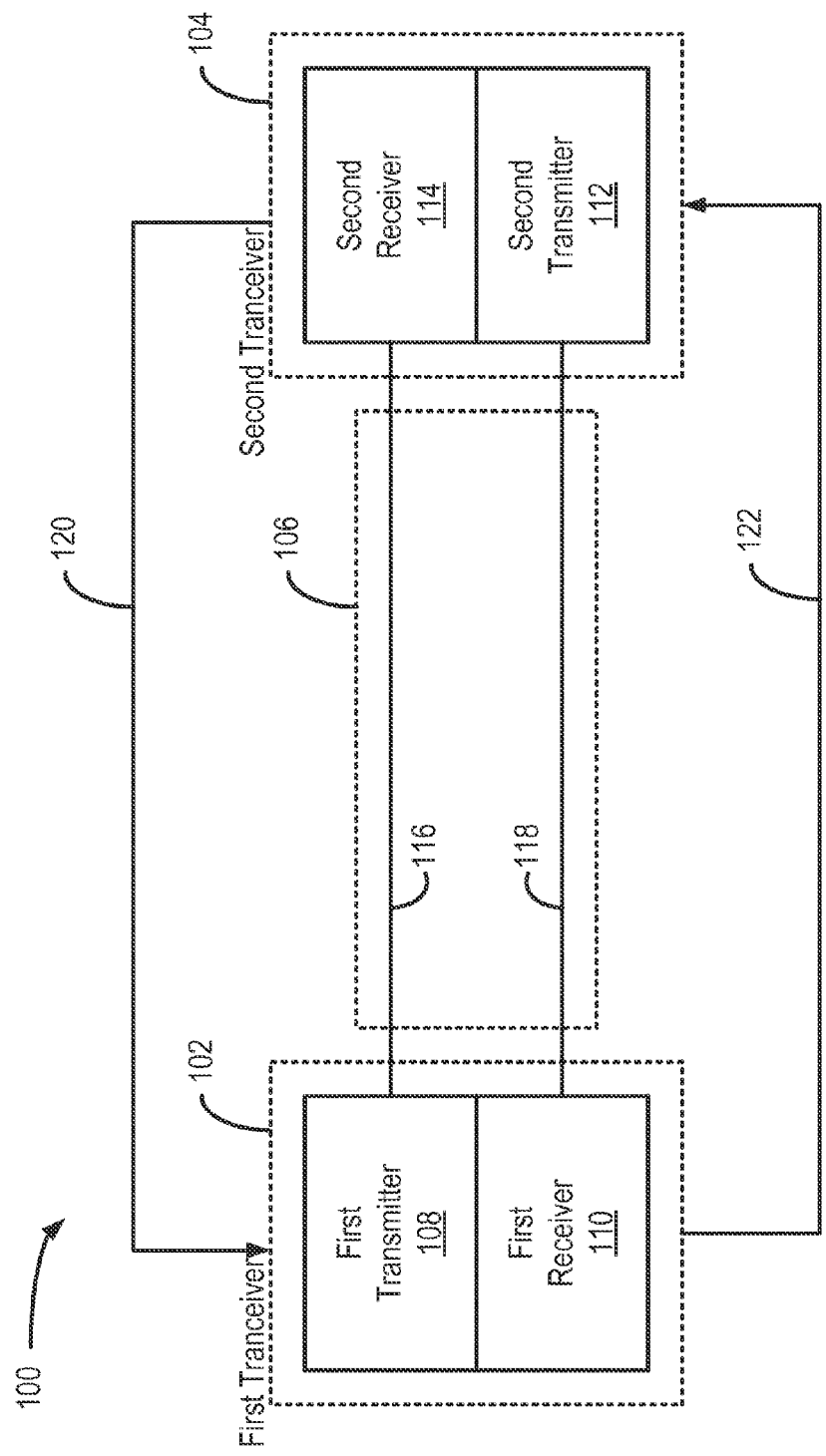
FIG. 1 shows an example communication system.

FIG. 1 shows an example communication system 100. In particular, the communication system 100 includes a first transceiver 102 communicating with a second transceiver 104 over a communication link 106. Each of the first transceiver 102 and the second transceiver 104 can be coupled to respective devices such as, network switches, computers, data-storage devices, network interface cards, host-bus adapters, etc. The first and the second transceivers 102 and 104 can provide communication between their respective devices. In some implementations, the communication link 106 can include wired or wireless communication links. In some implementations, the communication link 106 can include optical links.

The first transceiver 102 can include a first transmitter 108 and a first receiver 110. Similarly, the second transceiver 104 can include a second transmitter 112 and a second receiver 114. The first transmitter 108 can communicate with the second receiver 114 over a first communication link 116, while the second transmitter 112 can communicate with the first receiver 110 over a second communication link 118. In some implementations, the first transceiver 102 and the second transceiver 104 can communicate over out-of-band links. For example, the first transceiver 102 and the second transceiver 104 can communicate over out-of-band links 120 and 122. The out-of-band links 120 and 122 can be optical or non-optical links. In some implementations, the first and the second out-of-band communication links 120 and 122 can be utilized to communicate management data associated with the communication system 100.

In some implementations, the communication link 106 can be an optical communication link. For example, the first communication link 116 and the second communication link 118 can include optical fibers for carrying optical signals. The first transmitter 108 and the second transmitter 112 can each include circuitry for transmitting optical signals representative of the data being transmitted over the communication links 116 and 118 respectively. Similarly, the first receiver 110 and the second receiver 114 can include circuitry for receiving and processing the optical signals transmitted by the first transmitter 108 and the second transmitter 112, respectively, to regenerate the data.

In some implementations, the optical signals over the transmission link 106 may be undesirably altered by noise and multi-path interference (MPI). In particular, the polarization of optical signals generated by a transmitter may get undesirably altered or distorted when the optical signals travel over the optical transmission link 106. The change in polarization of the optical signals, and in particular of optical signals that include polarization division multiplexed optical signals, can result in partial or complete signal loss at the receiver. In some approaches, which use coherent detection methods for detecting received signals, information on the alteration in the polarization can be extracted and compensated for at the receiver. However, compensation based on coherent detection methods cannot be applied to direct detection receivers, in which only the amplitude of the received optical signal is detected. Moreover, compared to direct detection receivers, coherent detection receivers are costly and bulky. Some direct detection receivers utilize receiver side adaptive polarization compensators. However, receiver side polarization compensators also can be bulky and lossy. The power loss incurred due to polarization compensators can in turn reduce the link power budget margin.

The optical systems discussed below utilize transmitter side polarization compensation techniques. These techniques pre-distort the transmitted optical signal such that when the polarization of the transmitted signal is altered by the optical communication link, the receiver receives an optical signal that is substantially free of polarization distortion. The degree of pre-distortion applied to the transmitted signal can be based on the expected amount of distortion the signal would undergo when transmitted over the optical communication link. In some implementations, the expected amount of distortion, and in turn the degree of pre-distortion to be applied to the transmitted signal, can be determined using training sequences or RF pilot tones. These techniques can greatly simplify the receiver architecture in that the receiver can utilize direct detection receiver techniques and operate independently of bulky and lossy adaptive receiver side polarization compensation optics.

Figure 2:
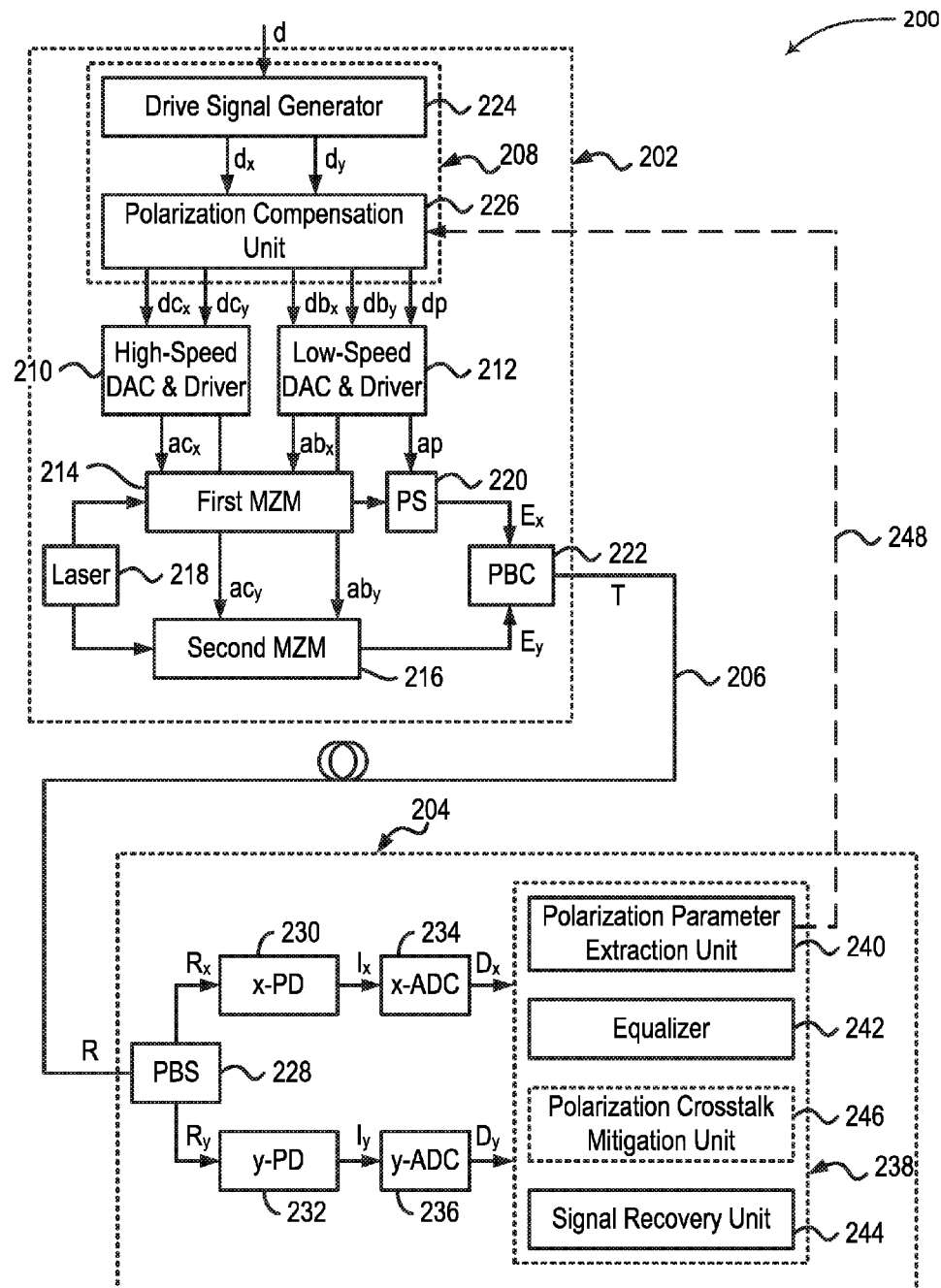
FIG. 2 shows a block diagram of an example communication system.

FIG. 2 shows a block diagram of an example communication system 200. In particular, the communication system includes a transmitter 202 and a receiver 204 communicating over an optical communication link 206. In some implementations, the communication system 200 shown in FIG. 2 can be utilized for implementing the communication system 100 shown in FIG. 1. For example, the transmitter 202 can be utilized for implementing the first transmitter 108 or the second transmitter 112; the receiver 204 can be utilized for implementing the first receiver 110 or the second receiver 114; and the optical communication link 206 can be utilized for implementing the first communication link 116 or the second communication link 118. In some implementations, the length of the optical communication link 206 can be less than about 10 kilometers.

The transmitter 202 can include a transmitter-side signal processor 208, a high-speed digital-to-analog converter (DAC) and driver 210, a low-speed DAC and driver 212, a first Mach-Zhender modulator (MZM) 214, a second MZM 216, a laser diode 218, a phase shifter 220, and a polarized beam combiner (PBC) 222. The transmitter-side signal processor 208 can include a drive signal generator 224 and a polarization compensation unit 226. The receiver 204 can include polarized beam splitter 228, an x-polarization photo-detector (x-PD) 230, a y-polarization photo-detector (y-PD) 232, a x-polarization analog-to-digital converter (x-ADC) 234, a y-polarization analog-to-digital converter (y-ADC) 236, and a receiver-side signal processor 238. The receiver-side signal processor 238 can include a polarization parameter extraction unit 240, an equalizer 242, and a signal recovery unit 244. In some implementations, as discussed below, the receiver-side signal processor 238 can also include a polarization crosstalk mitigation unit 246. The communication system 200 can further include a communication link 248 between the polarization parameter extraction unit 240 at the transmitter 204 and the polarization compensation unit 226 at the receiver.

At the transmitter 202, the drive signal generator 224 can generate digital drive signals based on data d received from a host device. In some implementations, drive signal generator 224 can receive distinct data streams, and generate two digital drive signals $d_x$ and $d_y$ based on the two distinct data streams. In some implementations, the two distinct data streams can be derived from a single data stream d. For example, digital drive signals $d_x$ and $d_y$ can represent drive signals associated with the two data streams one of which include all odd numbered bits or bytes and the other one includes all even numbered bits or bytes of the single data stream d. The digital drive signals $d_x$ and $d_y$, can represent digital values of drive voltages to be provided to a respective modulator (discussed below). For example, the digital drive signals $d_x$ and $d_y$ can represent values of multi-level drive signals such as four level drive signals used for pulse amplitude modulation (PAM4). In some implementations, as discussed further below, the digital drive signals $d_x$ and $d_y$ can be appropriately transformed and used for modulating respective carrier optical signals and be transmitted using polarization division multiplexing over x-polarization and y-polarization components, respectively of the transmitted optical signal.

The polarization compensation unit (PCU) 226 at the transmitter 202 can receive link polarization parameters from the polarization parameter extraction unit 240 over the communication link 248. The communication link 248 can represent for example, an in-band or an out-of-band link providing communication between the receiver 204 and the transmitter 202. The PCU 226 can utilize the values of the received polarization parameters to pre-distort the digital drive signals $d_x$ and $d_y$. The pre-distortion introduced in the digital drive signals results in a polarization rotation in the polarization-division multiplexed signal generated by the transmitter 202. The introduced angle of rotation is intentionally selected to be of the same magnitude but the opposite direction of the angle of rotation expected to be introduced by the optical communication link 206. As a result, at the receiver 204 the angle of rotation of polarization intentionally introduced by the transmitter 202 is canceled by the angle of rotation of polarization introduced by the optical link 206, resulting in a polarization compensated optical signal, which should substantially match the pre-compensated signal.

The PCU 226 can receive at least two link polarization parameters $\alpha$ and $\theta$ from the polarization parameter extraction unit 240 over the communication link 248. The values of parameters $\alpha$ and $\theta$, as discussed further below, can provide an estimate of the angle of rotation of polarization and the phase shift, respectively, introduced by the optical communication link 206. In some implementations, the link parameter $\alpha$ can be referred to as a link polarization rotation parameter, and the link parameter $\theta$ can be referred to as a phase shift parameter. The PCU 226 utilizes the link parameters $\alpha$ and $\theta$ to process the digital drive signals $d_x$ and $d_y$ to generate digital drive and bias signals, which can be further transformed to drive the first MZM 214 and the second MZM 216. In particular, the PCU 226 can determine desired optical field signals $E_{x0}$ and $E_{y0}$ corresponding to the digital drive signals $d_x$ and $d_y$ using the following equations:

$$E_{x0} = \varsigma(d_x) \tag{1}$$

$$E_{y0} = \varsigma(d_y) \tag{2}$$

where $\varsigma()$ is the transfer function for the first MZM 214 and the second MZM 216. In some implementations, the first MZM 214 and the second MZM 216 can have different transfer functions. In some implementations, $E_{x0}$ and $E_{y0}$ can represent the desired optical field signal at the receiver 204. In some implementations, $E_{x0}$ and $E_{y0}$ can represent the desired optical field signal transmitted by the transmitter 202 if the communication link 206 does not introduce any polarization rotation. However, typically, the communication link 206 does introduce polarization rotation, and in such instances, as discussed herein, the polarization rotation can be compensated for at the transmitter 202. To carry out polarization compensation, the PCU 226 can pre-distort the digital drive signals $d_x$ and $d_y$ based on one or more link parameters received from the receiver 204. For example, in some implementations, the PCU 226 can determine intermediate parameters $\rho_x$ and $\rho_y$ based on Equations (3) and (4) shown below:

$$\rho_x = \varsigma^{-1}(\cos\alpha \cdot E_{x0} + \sin\alpha \cdot E_{y0}) \tag{3}$$

$$\rho_y = \varsigma^{-1}(\sin\alpha \cdot E_{x0} - \cos\alpha \cdot E_{y0}) \tag{4}$$

where $\varsigma^{-1}()$ represents the inverse transfer function of the first and second MZMs 214 and 216, and $\alpha$ represents one of the link parameters received from the receiver 204. In some implementations, Equations (3) and (4) can be utilized in conditions where the first and the second MZMs 214 and 216 introduce zero-phase chirp in the modulated optical signal. However, in conditions where the first and the second MZMs 214 and 216 introduce non-zero-phase chirp in the modulated output signals, the following Equations (5) and (6) can be utilized for determining the intermediate parameters $\rho_x$ and $\rho_y$:

$$\rho_x = \varsigma^{-1}(\cos\alpha \cdot |E_{x0}| + \sin\alpha \cdot |E_{y0}|) \tag{5}$$

$$\rho_y = \varsigma^{-1}(\sin\alpha \cdot |E_{x0}| - \cos\alpha \cdot |E_{y0}|) \tag{6}$$

Having determined the intermediate parameters $\rho_x$ and $\rho_y$, the PCU 226 can further determine the pre-distorted digital drive signals $dc_x$ and $dc_y$, and the pre-distorted digital bias signals $db_x$ and $db_y$, using the following Equations (7)-(10):

$$db_x = \text{mean}(\rho_x) \tag{7}$$

$$db_y = \text{mean}(\rho_y) \tag{8}$$

$$dc_x = \rho_x - \text{mean}(\rho_x) \tag{9}$$

$$dc_y = \rho_y - \text{mean}(\rho_y) \tag{10}$$

Where the function mean( ) in the above equations denotes an average value, such as a DC component. Further, the PCU 226 can determine the phase shifter 220 digital drive signal dp by using the desired phase shift value $\theta$ received from the receiver 204 and the known driving voltage versus phase shift function of the phase shifter 220. For example, the driving signal dp can be determined using the following Equation (11):

$$dp = f^{-1}(\theta) \tag{11}$$

where $f^{-1}()$ represents an inverse phase shift transfer-function of the phase shifter 220.

The pre-distorted digital drive signals $dc_x$ and $dc_y$ can potentially vary at a rate that is at or greater than the symbol rate of the data d, and are therefore provided to a high-speed DAC and driver 210. The digital bias signals $db_x$ and $db_y$ can vary at a relatively slower rate, and therefore can be provided to a low-speed DAC and driver 212. In some implementations, the required sampling rate of the low-speed DAC can be based on the rate of polarization transients in the communication link 206. For example, the rate of polarization transients can represent how fast the state of polarization can change due to, for example ambient temperature and mechanical impacts. In some implementations, the rate of polarization transients can be about 60 rad/sec for aerial fiber and up to about 20 rad/sec for buried fiber. The phase shifter digital drive signal dp, which also varies at a slow rate relative to the digital drive signals $dc_x$ and $dc_y$, also can be provided to the low-speed DAC and driver 212.

The high-speed DAC and driver 210 can output analog RF drive signals $ac_x$ and $ac_y$ corresponding to the pre-distorted digital drive signals $dc_x$ and $dc_y$, respectively, while the low-speed DAC and driver 212 can output analog bias signals $ab_x$ and $ab_y$ corresponding to the pre-distorted bias signals $db_x$ and $db_y$, respectively. The low-speed DAC and driver 212 can also generate an analog phase shifter drive signal ap, as discussed above, which can be input to the phase shifter 220. The drive signals $ac_x$ and $ac_y$ are provided as drive signals to the first MZM 214 and the second MZM 216, respectively. Further, the bias signals $ab_x$ and $ab_y$ are provided as bias signals to the first MZM 214 and the second MZM 216, respectively.

The first and the second MZMs 214 and 216 can modulate an optical carrier signal generated by the laser 218 based on their respective drive and bias signals. In some implementations, the first and the second MZMs 214 and 216 can include optical waveguides formed of electro-optic transducer materials, such as, but not limited to, lithium niobate ($LiNbO_3$), gallium arsenide (GaAs), indium phosphate (InP), etc. In some implementations, optical modulators other than MZMs can be utilized for modulating the optical signal generated by the laser 218.

The modulated optical signal output by the first MZM 214 is phase shifted by the phase shifter 220. The phase shifter receives the phase shifter drive signal ap from the low-speed DAC and driver 212, and shifts the phase of the modulated output signal of the first MZM 214 based on the magnitude of the phase shifter driving signal ap. In some implementations, the phase shifter 220 can be implemented using, without limitation, a piezoelectric transducer, an electro-optic modulator, and an acousto-optic modulator. In some implementations, the phase shifter 220 can be alternatively used to shift the phase of the modulated output signal of the second MZM 216, instead of the first MZM 214. In some implantations, two phase shifters can be utilized to phase shift the output of both the first and the second MZMs 214 and 216 such that the net phase shift between the modulated optical signals output by the first and the second MZMs 214 and 216 is a function of the magnitude of the phase shifter driving signal ap. In some implementations, the phase shifter 220 can be placed after the laser 218 to change the phase of the carrier prior to being provided to the first or the second MZMs 214 and 216.

The phase shifted modulated optical signal $E_x$ output by the phase shifter 220 and the modulated optical signal $E_y$ output by the second MZM 216 can be combined, or polarization-division multiplexed, using the PBC 222. The PBC 222 polarizes and combines the modulated signals $E_x$ and $E_y$ onto a single optical fiber, such as the optical communication link 206. For typical implementations, a 90 degree polarization rotator can be integrated inside the PBC 222 such that the two inputs to the PBC 222 are allowed to be co-polarized by using typical polarization-maintaining fibers. For example, in some implementations, both the modulated optical signal $E_x$ and the modulated optical signal $E_y$ may be linearly polarized with their respective polarizations offset by about 90 degrees (or $\pi/2$ radians). In some implementations, alternative polarization-division multiplexers other than the PBC 222 can be utilized for combining the modulated signals $E_x$ and $E_y$ onto the communication link 206. The polarization-division multiplexed signal T output by the PBC 222 is transmitted over the communication link 206 to the receiver 204.

At the receiver 204, the received polarization-division multiplexed signal R is received by the PBS 228. The PBS 228 can split the orthogonally polarized received modulated optical signals $R_x$ and $R_y$, and provide the signals to the x-PD 230 and the y-PD 230. The x-PD 230 and the y-PD 232 can each include a photodetector that can convert an optical signal into an electrical signal, such as an electric current. For example, the x-PD 230 can convert the received optical signals $R_x$ into an electrical current $I_x$, while the y-PD 232 can convert the received optical signals $R_y$ into an electrical current $I_y$. In some implementations, each of the x-PD 230 and the y-PD 232 can include or can be followed by a trans-impedance amplifier (TIA) that can convert the electrical currents $I_x$ and $I_y$ into corresponding voltage signals, which in turn can be provided to an analog-to-digital converter. For example, the x-ADC 234 and the y-ADC 236 can convert the analog signals output by the x-PD 230 and the y-PD 232 into digital data $D_x$ and $D_y$, respectively.

As the polarized-division multiplexed optical signal T is pre-distorted to compensate for the rotation of polarization angle introduced by the optical communication link 206, the received optical signal R at the receiver 204 is substantially free of polarization shifts. As a result, the two components of the polarized-division multiplexed signal R will have polarization angles that are substantially aligned with the polarization axes of the PBS 228. Thus, the optical signals $R_x$ and $R_y$, in comparison to cases where no transmitter-side pre-distortion is utilized, have better intensity, cross-talk, and noise characteristics.

In some implementations, the digital data $D_x$ and $D_y$ can be further processed by the receiver-side signal processor 238 to extract the data transmitted by the transmitter 202. For example, the signal recovery unit 244 can include error correcting decoders such as forward error correction (FEC) decoders to detect errors in the data $D_x$ and $D_y$.

As mentioned above, the PCU 226 at the transmitter 202 utilizes link parameters to pre-distort the transmitted signals to compensate for polarization rotation introduced by the communication link 206. The PPEU 240 determines the values of these link parameters at the receiver 204. In some implementations, The PPEU 240 can determine the values of link parameters based on analysis of training data sent by the transmitter 202 and received at the receiver 204 over the communication link 206. For example, the transmitter 202 can be configured to generate training data and transmit the training data at least twice, once with a first state of polarizations such that $E_x$=c and $E_y$=0, and again with a second state of polarization such that $E_x$=c and $E_y$=c; where c can be a pre-determined constant. In some other implementations, training data with other example states of polarizations can also be utilized. At the receiver 204 the PPEU 240 can monitor the received signals, for example, the outputs of the x-PD 230 and the y-PD 232, to measure the power of the x-polarized and the y-polarized signals received for each of the two training data sent with two different states of polarizations. For example, the PPEU 240 can determine power values $P_{x1}$ and $P_{y1}$ corresponding to the optical power of the received training data with the first state of polarization and determine power values $P_{x2}$ and $P_{y2}$ corresponding to the optical power of the training data sent with the second state of polarization. In some implementations, the PPEU 240 can determine the link parameters α and θ based on the following Equations (12) and (13):

$$\alpha = \tan^{-1}\left(\sqrt{\frac{P_{y1}}{P_{x1}}}\right) \quad (12)$$

$$\cos\theta = \frac{P_{x2} - P_{y2}}{2 \cdot \cos\alpha \cdot \sin\alpha \cdot (P_{x2} + P_{y2})} \quad (13)$$

The Equations (12) and (13) shown above for the determination of the link parameters α and θ can be based, in part, on a polarization transformation matrix or other function used to represent the optical communication link 206. In some implementations, different transformation matrices or different states of polarization utilized in the training data can result in different expressions from the ones shown in Equations (12) and (13)) for determining the values for the link parameters α and θ. In some implementations, to improve accuracy of the determined values of the link parameters, the transmitter 202 can send several sets of training data for which the PPEU 240 can determine values of the link parameters.

In some implementations, the PPEU 240 can send the determined values of the link parameters α and θ to the transmitter 202 over an in-band communication channel or an out-of-band supervisory channel. For example, in some implementations, where each of the transmitter 202 and the receiver 204 is part of a transceiver at its respective end (such as, for example, shown in FIG. 1), the receiver 204 and the transmitter 202 can utilize the transmitter and receiver, respectively, at their respective ends to communicate the values of link parameters from the receiver 204 to the transmitter 202. In some such implementations, the link parameters can be transmitted to the transmitter 202 in-band over the optical communication link 206. In some implementations, the out-of-band communication can include utilizing communication link 248 to transmit the values of link parameters. In some implementations, existing management signaling, such as, for example, that used for Ethernet signaling can be utilized for transmitting the values of link parameters.

The receiver 204 also includes an equalizer 242 for mitigating or reducing the effects of inter-symbol-interference (ISI). In some implementations, the equalizer 242 can be implemented using linear feedforward equalizers, such as a 9-tap, T-spaced 1×1 linear feedforward equalizer. In some other implementations, the equalizer 242 can be implemented using decision feedback equalizers. In some implementations, the output of the x-ADC 234 and y-ADC 236 is provided to the equalizer 242 to address ISI. The processed output of the equalizer 242 can be provided to the signal recovery unit 244 for recovering the received data.

As mentioned above, the pre-distortion of the transmitter signal is carried out based on the values of the link parameters α and θ estimated at the receiver 204. In some implementations, the estimated values of the link parameters α and θ may deviate from their actual values when, for example, the estimates are based on a small number of training sequences. In some implementations, transmission signal characteristics such as polarization crosstalk and bit-error-ratio (BER) can be overly sensitive to the deviation of the estimate of the link parameters from their actual values. For example, in some implementations, the polarization crosstalk at the receiver can exceed about −20 dB and the power penalty at BER of about $10^{-3}$ can exceed about 1.4 dB if the estimated value of α deviates more than about 0.1 radians from its actual value. In some implementations, the receiver 204 can include a polarization crosstalk mitigation unit (PCMU) 246 to reduce the sensitivity of the transmission signal characteristics on the estimated values of the link parameters.

Figure 3:
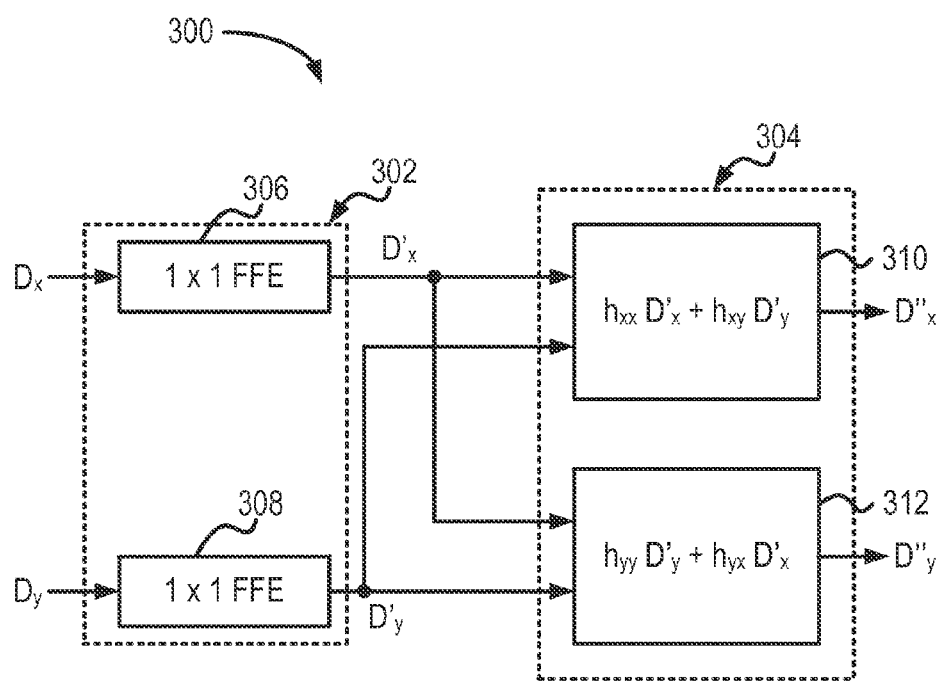
FIG. 3 shows an example two-stage equalizer that can be utilized in the receiver shown in FIG. 2.

FIG. 3 shows an example two-stage equalizer 300 that can be utilized in the receiver 204 shown in FIG. 2. In particular, the two-stage equalizer 300 can be utilized in place of the equalizer 242 and the PCMU 246 in the receiver 204 shown in FIG. 2. The two-stage equalizer 300 can include a first stage 302 followed by a second stage 304. The first stage 302 can be similar to the equalizer 242 discussed above in relation to FIG. 2. In particular, the first stage can include a linear feedforward equalizer (FFE) 306 and 308 for each of the data streams $D_x$ and $D_y$. The first stage 302 can be used for compensating for band-limiting effects of the transmitter, the channel as well as the receiver. The second stage 304 can include a 2×2 multiple input multiple output (MIMO) equalizer. In particular, the second stage can include a first transformation block 310 and a second transformation block 312. Both the first transformation block 310 and the second transformation block 312 receive both the outputs $D'_x$ and $D'_y$ of the first stage 302. The first transformation block 310 can be implemented as a 1-tap 2×2 FFE having coefficients $h_{xx}$ and $h_{xy}$. Similarly, the second transformation block 312 also can be implemented as a 1-tap 2×2 FFE having coefficients $h_{yy}$ and $h_{yx}$. The coefficients $h_{xx}$, $h_{xy}$, $h_{yy}$, and $h_{yx}$ can be determined, for example, using blind equalization algorithms, such as a least mean square (LMS) algorithm. In some implementations, crosstalk can be described as a result of power exchange between the signals multiplexed over the x- and y-polarizations when the combined signal is transmitted over the communication link. As this power exchange is a 'linear process (to the first order with relatively small polarization changes)', the effects of the power exchange can be mitigated using the 2×2 FFEs shown in FIG. 3. The first transformation block 310 processes the $D'_x$ and $D'_y$ inputs and generates an output denoted by $D''_x$, while the second transformation block 312 processes the same $D'_x$ and $D'_y$ inputs and generates an output denoted by $D''_y$, where the outputs $D''_x$ and $D''_y$ are substantially free of crosstalk.

In some implementations, utilizing the two-stage equalizer 300 in the receiver 200 shown in FIG. 2 in place of the equalizer 242 and the PCMU 246 can advantageously reduce the sensitivity of the optical signal characteristics to deviations in the estimates of values of the link parameters from their actual values. For example, in some implementations, the power penalty at a BER of about $10^{-3}$ can be reduced from about 1.4 dB to about 0.5 dB for a deviation in the estimate of the value of a of about 0.1 radians from the actual value. The reduced sensitivity to the deviations in the estimate of the value of the link parameters relaxes the level of accuracy needed by the polarization parameter extraction unit (240 in FIG. 2), thereby reducing processing time and/or costs. In some implementations, the reduced sensitivity also can improve the polarization tracking speed of the communication system. For example, for a communication link that is about 100 m long, the round-trip propagation time for an optical signal can be about 1 μs. Assuming that the communication system needs about 1 μs to compensate for a particular change in polarization rotation, the communication system can compensate for a polarization change of about 0.1 radians at a rate of about 50 K radians/s. This rate of compensation is much faster than typical rates of change of polarizations observed in actual communication links.

Figure 4:
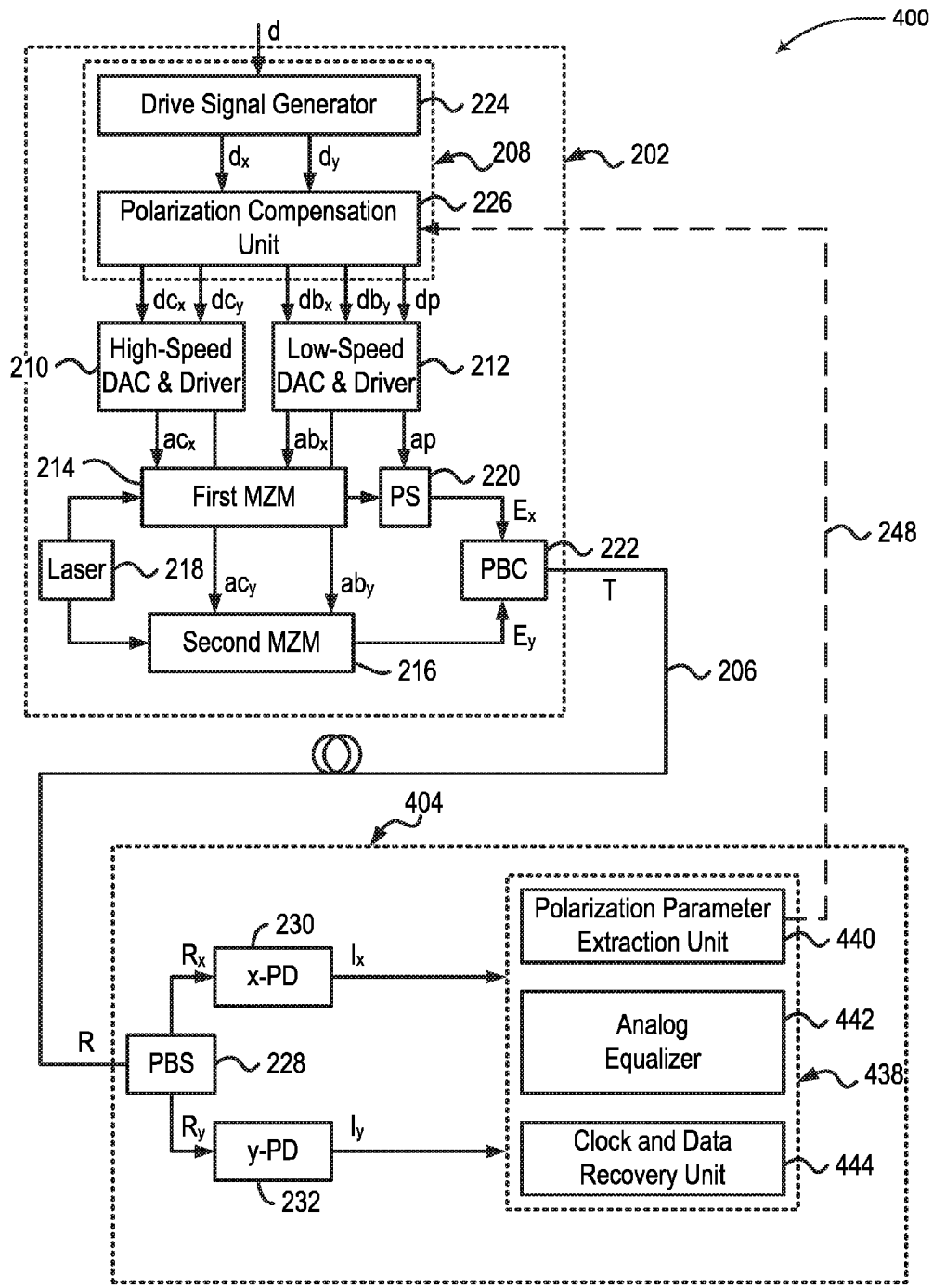
FIG. 4 shows a block diagram of another example communication system.

FIG. 4 shows a block diagram of another example communication system 400. In particular, the communication system 400 includes a receiver 404 that utilizes analog techniques, instead of digital techniques utilized in the receiver 204 shown in FIG. 2, for processing the received optical signals. For example, in some implementations, the receiver 404 can include an analog processor 438 for processing the electrical signals $I_x$ and $I_y$ generated by the x-PD 230 and the y-PD 232. Unlike the receiver 204, which utilized ADCs 234 and 236 for digitizing the electrical signals $I_x$ and $I_y$, the receiver 404 processes these electrical signals in the analog domain.

The analog processor 438 can include an analog polarization parameter extraction unit (PPEU) 440 for extracting link parameters, an analog equalizer 442 for equalizing the received signals, and a clock and data recovery unit (CDRU) 444 for sampling clock synchronization and data extraction.

The PPEU 440 can extract link parameters based on RF-pilot tones transmitted from the transmitter. For example, in some implementations, the transmitter 202 can transmit a pilot tone of frequency F1 using x-polarization and transmit two pilot tones at frequencies F1 an F2 using y-polarization. The PPEU 440 can measure the power of the received electrical signal for each of the received pilot tones. For example, the PPEU 440 can determine power values for the variables $P_{x1}$ and $P_{y1}$ corresponding to the power of the received electrical signal in the x- and y-polarization, respectively, at frequency F1, and determine values for the power variables $P_{x2}$ and $P_{y2}$ corresponding to the power of the received electrical signal at the x- and y-polarization, respectively, at frequency F2. In some implementations, the values for $P_{x1}$ and $P_{y1}$ and $P_{x2}$ and $P_{y2}$, can be determined using electrical spectrum analysis of the received electrical signals. Once the PPEU 440 determines the values for $P_{x1}$ and $P_{y1}$ and $P_{x2}$ and $P_{y2}$, the estimates for the values of the link parameters can be determined using Equations (12) and (13) discussed above.

In some implementations, the analog equalizer can include continuous time linear equalizer (CTLE) or a finite impulse response (FIR) filter.

In some implementations, the CDRU 444 can include clock recovery components such as phase-locked-loops for determining the clock or the symbol rate of the received signal. In some implementations, the CDRU 444 also can include phase detectors for detecting the phase of the received signal. Once the symbol rate and phase is known, the CDRU 444 can sample the electrical signal output by the analog equalizer 442 to recover the data.

As used herein, a "unit" can include hardware circuitry, software, or a combination of hardware and software for implementing its various components.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. An optical transmitter, comprising:
   a drive signal generator configured to generate a first data signal corresponding to a first data stream and a second data signal corresponding to a second data stream distinct from the first data stream;
   a polarization compensator configured to:
   receive from a receiver estimates of values of link parameters associated with an optical link connecting the receiver and the optical transmitter, the link parameters including a link polarization rotation parameter and a phase shift parameter, and
   pre-distort the first data signal and the second data signal based on the link polarization rotation parameter to generate a first set of pre-distorted drive signals and a second set of pre-distorted drive signals, and
   generate a phase shift signal based on the phase shift parameter;
   a first electro-optic modulator configured to modulate an optical carrier based on the first set of pre-distorted drive signals to generate a first modulated optical signal;
   a second electro-optic modulator configured to modulate the optical carrier based on the second set of pre-distorted drive signals to generate a second modulated optical signal;
   a phase shifter configured to cause a shift in the phase of the first modulated optical signal relative to the phase of the second modulated optical signal based on the phase shift signal; and
   a polarization-division multiplexer configured to polarization multiplex the first modulated optical signal with a first polarization and the second modulated optical signal with a second polarization for transmission over the optical link.

2. The optical transmitter of claim 1, wherein the polarization compensator is configured to generate the first set of pre-distorted drive signals, the second set of pre-distorted drive signals, and the phase shift signal based on inverse transfer functions associated with the first electro-optic modulator, the second electro-optic modulator and the phase shifter.

3. The optical transmitter of claim 1, wherein the phase shifter causes a shift in the relative phase of the first modulated optical signal and the second modulated optical signal by shifting the phase of the optical carrier signal received by one of the first electro-optic modulator and the second electro-optic modulator based on the phase shift signal.

4. The optical transmitter of claim 2, wherein the first set of pre-distorted drive signals includes a first drive signal and a first bias signal for driving and biasing, respectively, the first electro-optic modulator, and the second set of pre-distorted drive signals includes a second drive signal and a second bias signal for driving and biasing, respectively, the second electro-optic modulator.

5. An optical transceiver comprising:
   a direct detection optical receiver configured to receive an optical signal, the receiver including:
   a polarization division demultiplexer configured to split the received optical signal into a first polarized optical signal and a second polarized optical signal;
   a first photo-detector configured to generate a first electrical signal based on the intensity of the first polarized optical signal;
   a second photo-detector configured to generate a second electrical signal based on the intensity of the second polarized optical signal; and
   a polarization parameter extraction unit configured to estimate values of link parameters representing at least an estimated angle of rotation of polarization and an estimated phase shift introduced by the optical link on an optical signal transmitted by a transmitter to the direct detection optical receiver across an optical link and to transmit the estimated values of the link parameters to the transmitter.

6. The transceiver of claim 5, wherein the receiver further includes a two-stage crosstalk mitigation unit including a first stage of single-input-single-output feedforward equalizers and a second stage of multi-input-multi-output feedforward equalizers, configured to process the first electrical signal and the second electrical signal through the first stage and the second stage.

7. The transceiver of claim 5, wherein the polarization parameter extraction unit is further configured to estimate the values of link parameters based on a measured power of the first electrical signal and a measured power of the second electrical signal corresponding to each of a plurality of training optical signals transmitted by a transmitter.

8. The transceiver of claim 5, further comprising: an optical transmitter configured to transmit polarization-division multiplexed data signals over an optical communication link, and to pre-distort the transmitted data signals to compensate for rotation of polarization angle by the optical communication link based on a value of a link polarization rotation parameter associated with the optical communication link received from a receiver.

9. The transceiver of claim 7, wherein at least one of the plurality of training optical signals has a state of polarization that is different from a state of polarization of another one of the plurality of training optical signals.

10. The transceiver of claim 8, wherein the optical transmitter is further configured to cause a shift in the phase of one of the transmitted data signals relative to the phase of another one of the transmitted data signals based on a value of a phase shift parameter associated with the optical communication link received from the receiver.

11. A method for communicating optical signals over an optical communication link comprising:
  generating a first data signal corresponding to a first data stream and a second data signal corresponding to a second data stream distinct from the first data stream;
  receiving from a receiver estimates of values of link parameters associated with an optical link connecting the receiver and a transmitter, the link parameters including a link polarization rotation parameter and a phase shift parameter;
  generating a first set of pre-distorted drive signals and a second set of pre-distorted drive signals by pre-distorting the first data signal and the second data signal based on the estimated values of the link polarization rotation parameter;
  generating a phase shift signal based on the estimated values of the phase shift parameter;
  modulating an optical carrier signal based on the first set of pre-distorted drive signals to generate a first modulated optical signal having a first polarization;
  modulating the optical carrier signal based on the second set of pre-distorted drive signals to generate a second modulated optical signal having a second polarization;
  causing a shift in the phase of the first modulated optical signal relative to the phase of the second modulated optical signal based on the phase shift signal; and
  polarization-division multiplexing the first modulated optical signal and the second modulated optical signal for transmission over the optical link.

12. The method of claim 11, wherein receiving estimated values of link parameters associated with an optical link includes receiving estimates of values of link parameters representing at least an estimated angle of rotation of polarization introduced by the optical link on an optical signal.

13. The method of claim 11, wherein generating a first set of pre-distorted drive signals and a second set of pre-distorted drive signals includes generating the first set of pre-distorted drive signals and the second set of pre-distorted drive signals based further on inverse transfer functions associated with modulators used for generating the first modulated optical signal and the second modulated optical signal.

14. The method of claim 13, wherein the first set of pre-distorted drive signals includes a first drive signal and a first bias signal used for driving and biasing, respectively, the modulator used for generating the first modulated optical signal, and wherein the second set of pre-distorted drive signals includes a second drive signal and a second bias signal used for driving and biasing, respectively, the modulator used for generating the second modulated optical signal.

15. The method of claim 11, further comprising:
  receiving, at a receiver, a polarization-division multiplexed optical signal;
  demultiplexing the polarization-division multiplexed optical signal into a first polarized receiver optical signal and a second polarized receiver optical signal;
  converting the first polarized receiver optical signal and the second polarized receiver optical signal into a first electrical signal and a second electrical signal, respectively; and
  estimating, from the first electrical signal and the second electrical signal, values of link polarization parameters, associated with the optical link, representing at least an estimated angle of rotation of polarization introduced by the optical link.

16. The method of claim 15, wherein estimating values of link polarization parameters includes measuring a power of the first electrical signal and a power of the second electrical signal corresponding to each of a plurality of training optical signals received over the optical link.

17. The method of claim 15, further comprising mitigating crosstalk by processing the first electrical signal and the second electrical signal through a first equalizer stage including single-input-single-output feedforward equalizers and a second equalizer stage including multi-input-multi-output feedforward equalizers.

18. The method of claim 16, wherein measuring power of the first electrical signal and the second electrical signal corresponding to each of a plurality of training optical signals received over the optical link includes receiving at least one of the plurality of training optical signals with a state of polarization that is different from a state of polarization of another one of the plurality of training optical signals.

* * * * *